United States Patent
Chen

(10) Patent No.: US 12,374,685 B2
(45) Date of Patent: Jul. 29, 2025

(54) POLYMORPHIC LITHIUM-SILICON COMPOUND FOR USE IN PURE SILICON ANODE OF LITHIUM-ION BATTERY AND USE THEREOF

(71) Applicant: NATIONAL SYNCHROTRON RADIATION RESEARCH CENTER, Hsinchu (TW)

(72) Inventor: Shi-Wei Chen, Hsinchu (TW)

(73) Assignee: NATIONAL SYNCHROTRON RADIATION RESEARCH CENTER, Hsinchu (TW)

( * ) Notice: Subject to any disclaimer, the term of this patent is extended or adjusted under 35 U.S.C. 154(b) by 907 days.

(21) Appl. No.: 17/601,306

(22) PCT Filed: Apr. 12, 2019

(86) PCT No.: PCT/CN2019/082449
§ 371 (c)(1),
(2) Date: Oct. 4, 2021

(87) PCT Pub. No.: WO2020/206678
PCT Pub. Date: Oct. 15, 2020

(65) Prior Publication Data
US 2022/0149361 A1    May 12, 2022

(51) Int. Cl.
*H01M 4/38*     (2006.01)
*H01M 4/02*     (2006.01)
(Continued)

(52) U.S. Cl.
CPC ........... *H01M 4/386* (2013.01); *H01M 4/043* (2013.01); *H01M 4/0461* (2013.01);
(Continued)

(58) Field of Classification Search
CPC .... H01M 4/386; H01M 4/043; H01M 4/0461; H01M 4/1395; H01M 10/0525; H01M 2004/021; H01M 2004/027
See application file for complete search history.

(56) References Cited

U.S. PATENT DOCUMENTS

2009/0169996 A1   7/2009  Zhamu
2012/0094181 A1   4/2012  Kim et al.
(Continued)

FOREIGN PATENT DOCUMENTS

CN    102804463 A    11/2012
CN    104335395 A    2/2015
(Continued)

OTHER PUBLICATIONS (Zeilinger et al. Chemistry of Materials 2013 25 (20), 4113-4121 (Year: 2013).*

(Continued)

*Primary Examiner* — Ula C Ruddock
*Assistant Examiner* — Olivia Mason Ruggiero
(74) *Attorney, Agent, or Firm* — MUNCY, GEISSLER, OLDS & LOWE, P.C.

(57) ABSTRACT

A polymorphic lithium-silicon compounds for use in pure silicon anode of lithium-ion battery and use thereof are provided. The pure silicon anode includes nucleuses which have one or more structures of $Li_{4.1}Si\_Cmcm$, $Li_{13}Si_4\_Pbam$, $Li_2Si\_C12m1$, and $LiSi\_I41/AZ$. It was generally believed $Li_{4.1}Si\_Cmcm$ to be a high-temperature stable phase, not presenting at room temperature or in the pure silicon anode of lithium-ion battery, but this present invention proves that $Li_{4.1}Si\_Cmcm$ can exist in the disclosed material. After lithiation process, the pure silicon anode can have a structure of one or more of $Li_{4.1}Si\_Cmcm$, $Li_{13}Si_4\_Pbam$, $Li_2Si\_C12m1$, and $LiSi\_I41/AZ$, with (Continued)

extremely improved capacity. The present disclosure may increase the electrical capacity of the pure silicon anode in actual use and solve the problem of the existing pure silicon anode that the volume expansion after repeated lithiation and delithiation leads to electrode damage and battery failure.

18 Claims, 8 Drawing Sheets

(51) Int. Cl.
    *H01M 4/04*         (2006.01)
    *H01M 4/1395*     (2010.01)
    *H01M 10/0525*    (2010.01)

(52) U.S. Cl.
    CPC ..... *H01M 4/1395* (2013.01); *H01M 10/0525* (2013.01); *H01M 2004/021* (2013.01); *H01M 2004/027* (2013.01)

(56) References Cited

U.S. PATENT DOCUMENTS

| | | | |
|---|---|---|---|
| 2014/0030602 A1* | 1/2014 | Park | H01M 4/386 429/231.95 |
| 2014/0050980 A1* | 2/2014 | Kang | H01M 4/622 429/211 |
| 2018/0151874 A1* | 5/2018 | Kim | H01M 4/36 |
| 2018/0316014 A1* | 11/2018 | Dash | H01M 4/0402 |
| 2019/0088922 A1* | 3/2019 | Zhamu | C01B 33/00 |

FOREIGN PATENT DOCUMENTS

| | | | |
|---|---|---|---|
| JP | 2009032644 A | * | 2/2009 |
| JP | 2015518263 A | | 6/2015 |
| KR | 20100136073 A | | 12/2010 |
| WO | 2012073313 A1 | | 6/2012 |

OTHER PUBLICATIONS

San-Cheng Lai, Solid Lithium-Silicon Electrode, J. Electrochem. Soc., 1976, vol. 123, pp. 1196-1197.
Notice of Reasons for Rejection of JP family patent Application No. 2021-559708, mailed on Nov. 29, 2022, with English translation, 9 pages.
The First Office Action of CN family patent Application No. 201980095369.6, mailed on May 30, 2023.
English translation (brief) of the First Office Action of CN family patent Application No. 201980095369.6, mailed on May 30, 2023.
Notice of Reasons for Rejection of JP family patent Application No. 2021-559708, mailed on Jul. 25, 2023.
English translation of the Notice of Reasons for Rejection of JP family patent Application No. 2021-559708, mailed on Jul. 25, 2023.
The second Office Action (with Search Report) of CN family patent Application No. 201980095369.6, mailed on Dec. 28, 2023.
English translation (brief) of the second Office Action of CN family patent Application No. 201980095369.6, mailed on Dec. 28, 2023.
English translation of the Search Report of CN family patent Application No. 201980095369.6, mailed on Dec. 28, 2023.
Zeilinger, M. et al., "Revision of the Li—Si phase diagram: discovery and single-crystal X-ray structure determination of the high-temperature phase Li4.11Si", Chemistry of Materials, vol. 25, Oct. 10, 2013 (Oct. 10, 2013), ISSN:0897-4756, pp. 4623-4632, (pp. 10).
Gruber, T. et al., "Metastable structure of Li13Si4", Physical Review B, vol. 93, Apr. 6, 2016 (Apr. 6, 2016), ISSN:2469-9950, pp. 144104-1 to 144104-10, (pp. 10).
Hou, Xianhua et al., "The roles of intermediate phases of Li—Si alloy as anode materials for lithium-ion batteries", Rare Metal Materials and Engineering,vol. 39, No. 12, Dec. 31, 2010 (Dec. 31, 2010), ISSN:1002-185X, pp. 2079-2083, (pp. 10).
The first Office Action of KR family patent Application No. 10-2021-7036286, mailed on Jun. 25, 2024.
English translation (Dossier) of the first Office Action of KR family patent Application No. 10-2021-7036286, mailed on Jun. 25, 2024.
Michael Zeilinger, Iryna M. Kurylyshyn, Ulrich Haussermann, and Thomas F. FässlerRevision of the Li—Si Phase Diagram: Discovery and Single-Crystal X-ray Structure Determination of the High-Temperature Phase Li4.11Si. Chemistry of Materials. 2013, 25, pp. 4623-4632 (2013).

* cited by examiner

Li$_{4.1}$Si_Cmcm

Lattice parameter
a=4.5246
b=21.9437
c=13.2001
Lattice point
Si(1): 0, 0.256155, 0.25
Si(2): 0, 0.454324, 0.25
Si(3): 0.5, 0.105366, 0.067645
Li(1): 0.5, 0.0327, 0.25
Li(2): 0.5, 0.32951, 0.25
Li(3): 0, 0.39263, 0.25
Li(4): 0.5, 0.14744, 0.5
Li(5): 0, 0.17392, 0.08488
Li(6): 0.2084, 0.13867, 0.25
Li(7): 0, 0.1641, 0.1246
Li(8): 0, 0.04654, 0.12217
Li(9): 0, 0.31629, 0.07895
Li(10): 0, 0.47119, 0.09071
Li(11): 0.5, 0.23121, 0.13577
Li(12): 0.5, 0.40459, 0.06398

● Si
· Li

POLYMORPHIC LITHIUM-SILICON COMPOUND FOR USE IN PURE SILICON ANODE OF LITHIUM-ION BATTERY AND USE THEREOF

CROSS-REFERENCE TO RELATED APPLICATION

This patent application claims the benefit of international patent application No. PCT/CN2019/082449 filed Apr. 12, 2019. The contents of international patent application No. PCT/CN2019/082449 are expressly incorporated herein by reference thereto.

FIELD

The present invention relates to a polymorphic lithium-silicon compound and, particularly, to a lithium-silicon crystal with a special structure for use in a pure silicon anode of a lithium-ion battery, and a preparation method thereof.

BACKGROUND

In recent years, the development of electric vehicles has accelerated dramatically, with the performance of electric vehicles increasing to levels previously achieved only by high-end sports cars powered by internal combustion engines. Such excellent performance of electric vehicles can be primarily attributed to improvements in lithium-ion batteries, including high energy capacity for greater driving range, high power generation for rapid acceleration, stable charging and discharge for safety and durability. However, current electric vehicles still suffer from limited battery capacity, which leads to consumers' range anxiety that is a major factor limiting the popular adoption of electric vehicles. The limited battery capacity is closely related to the insufficient capacity of electrode materials used in 'lithium-ion batteries of electric vehicles.

Traditionally, lithium-ion batteries use graphite as the anode material, but the theoretical capacity of graphite is only 372 mAh/g, which can no longer meet the needs of lithium-ion batteries for vehicles. In contrast, silicon has a theoretical capacity of 4200 mAh/g, which is about 11 times that of graphite, and is therefore regarded as a new generation battery anode material that can replace the graphite of traditional electrodes.

Theoretically, after a pure silicon anode is fully charged (lithiated), the anode will form a lithium-silicon compound $Li_{22}Si_5\_F23$ to provide a capacity of 4200 mAh/g. But in practice, due to the limitations of kinetics, a pure silicon anode after lithiation will introduce the lithium-silicon compound $Li_{15}Si_4\_I\text{-}43d$, which can provide a capacity of 3579 mAh/g theoretically. Even a pure silicon anode can exhibit a very high capacity the accompanied volume expansion (400%) is still a big issue to cause cracking and failure of a silicon anode as well as a lithium ions battery.

Therefore, there is a need of an improved pure silicon anode to provide greater capacity and better stability for use in lithium-ion batteries.

Controlling the formation of the lithium-silicon compound and generating the corresponding electrical capacity are important considerations in the production of pure silicon anodes. The present invention discloses that there are several lithium-silicon compounds with different compositions in addition to the $Li_{22}Si_5\_F23$ and $Li_{15}Si_4\_I\text{-}43d$ in the silicon anode. As proposed in the reference (Chem. Mater. 2013, 25, 4623-4632), $Li_{4.1}Si\_Cmcm$ was a high-temperature stable phase that can only exist at temperatures greater than 481 degrees Celsius. In the present invention, the lithium-silicon compound $Li_{4.1}Si\_Cmcm$ is obtained and proved to exist in the pure silicon anode at room temperature for the first time.

SUMMARY OF THE INVENTION

Based on the above objectives, the present invention provides a polymorphic lithium-silicon compound for a pure silicon anode of a lithium-ion battery, which has an X-ray powder diffraction pattern (XRPD) substantially the same as that shown in FIG. 5 and an X-ray absorption spectrum substantially the same as that shown in FIG. 6A.

In some specific embodiments of the present invention, the polymorphic lithium-silicon compound is selected from one or more groups consisting of $Li_{4.1}Si\_Cmcm$, $Li_{13}Si_4\_Pbam$, $Li_2Si\_C12/m1$, and $LiSi\_I41AZ$ ordered lattice structures, wherein the $Li_{4.1}Si\_Cmcm$ ordered lattice structure is characterized by having an X-ray powder diffraction (XRPD) under a wavelength of 1.5406 angstrom including 2θ peak positions at 15.7±0.1 degree, 20.72±0.1 degree, 24.11±0.1 degree, 26.05±0.1 degree, 27.15±0.1 degree, 39.52±0.1 degree, 41.36±0.1 degree and 43.16±0.1 degree; the $Li_{13}Si_4\_Pbam$ ordered lattice structure is characterized by having X-ray powder diffraction (XRPD) under Cu target Kα X-ray radiation including 2θ peak positions at 12.33±0.1 degree, 20.72±0.1 degree, and 22.6±0.1 degree; the $Li_2Si\_C12/m1$ ordered lattice structure is characterized by having X-ray powder diffraction (XRPD) under Cu target Kα X-ray radiation including 2θ peak positions at 14.05±0.1 degree and 23.61±0.1 degree; and the $LiSi\_I41AZ$ ordered lattice structure is characterized by having X-ray powder diffraction (XRPD) under Cu target Kα X-ray radiation including 2θ peak positions at 18.77±0.1 degree and 19.28±0.1 degree.

In some specific embodiments of the present invention, the polymorphic lithium-silicon compound is selected from one or more groups consisting of $Li_{4.1}Si\_Cmcm$, $Li_{13}Si_4\_Pbam$, $Li_2Si\_C12/m1$ and $LiSi\_I41AZ$ ordered lattice structures, and has an obvious absorption peak appeared at an incident light energy position of 1847 eV in the X-ray absorption spectrum.

In another aspect of the present invention, a pure silicon anode for lithium-ion batteries is provided. The anode comprises one or more nucleus, in which the nucleus comprises the polymorphic lithium-silicon compound described above.

In some specific embodiments of the present invention, the pure silicon anode for lithium-ion batteries includes one or more nucleus, which has a size between 1 nm and 5,000,000 nm.

In another aspect, the present invention provides a method for preparing the pure silicon anode for lithium-ion batteries described above, comprising: plating a protective layer on the surface of a pure silicon powder except a tiny site to produce an exposed surface; compacting and placing the pure silicon powder in a groove of a copper substrate, and covering with a screen to prevent the pure silicon powder from shedding; performing lithiation and delithiation reactions using an electrolyte of EC/DEC+FEC; controlling a voltage so that a lithium flux of a lithium ion concentration higher than 4 atomic percent per unit area is generated on the exposed surface; controlling a lithiation rate or a delithiation rate between 0.5 C and 30 C (0.5 C is equivalent to complete charging (lithiation) within 2 hours, 1 C is equivalent to complete charging (lithiation) within 1 hour, and so on).

In some specific embodiments of the present invention, the pure silicon anode for lithium-ion batteries can be composed of hollow, multilayer, porous, nanowire, nanopillar or nanoparticle morphology, which has a shell thickness, a film thickness, a mold wall thickness and a line width between 1 nm and 100 nm.

The present invention further discloses a method which allows the pure silicon anode to obtain the final structure of $Li_{4.1}Si\_Cmcm$ after lithiation and delithiation and perform an extremely high electrical capacity. The method implants the nano-scale nucleus of one or more of $Li_{4.1}Si\_Cmcm$, $Li_{13}Si_4\_Pbam$, $Li_2Si\_C12m1$, and $LiSi\_I41/AZ$ into the pure silicon anode and thus forms the final structure of $Li_{4.1}Si\_Cmcm$ during the lithiation and delithiation process based on nucleation theory.

The specially designed pure silicon anode of the present invention has an electrical capacity of more than 6 times higher than that of the traditional graphite electrode, which is much better than that of the ordinary pure silicon anode. This is because the specially designed pure silicon anode will form the final phase $Li_{4.1}Si\_Cmcm$ (equal to $Li_{16.4}Si_4\_Cmcm$) after charging (lithiation reaction), which is significantly different from the final phase $Li_{15}Si_4\_I$-43d of the ordinary pure silicon anode, especially for the increasing number of lithium ions. The pure silicon anode of the present invention can also perform excellent structural stability when being applied to powders with special morphology (such as hollow powders). Consequently, the present invention can simultaneously increase the electrical capacity of the pure silicon anode in actual use and solve the problem of the existing pure silicon anode that the volume expansion after repeated lithiation and delithiation leads to electrode damage and battery failure.

Among the figures, 100 is pure silicon anode powder with nucleus species; 102 is nucleus species; 104 is silica powder; 200 is lithium-ion battery; 202 is anode; 204 is cathode; and 206 is separation membrane.

DETAILED DESCRIPTION

In order to have a further understanding of the present invention, the following embodiments are exemplified.

Pre-lithiation is an electrochemical reaction in which lithiation and delithiation reactions are performed on the silicon anode. After the lithiation and delithiation reactions, the silicon anode will transform to an amorphous structure, leaving behind a nano-scale nucleus. In the present invention, before performing the lithiation reaction, a special protective layer is fabricated on the powder surface and a specific site is left for the lithiation reaction (uneven powder coating). The lithium flux ($Li^+$ ion flux) at the specific site is therefore relatively high, resulting in the formation nucleus with short-range-ordering structures of $Li_{4.1}Si\_Cmcm$, $Li_{13}Si_4\_Pbam$, $Li_2Si\_C12m1$, or $LiSi\_I41/AZ$, which is different from the $Li_{15}Si_4\_I$-43d ordering structure of traditional electrodes.

Figure 1A:
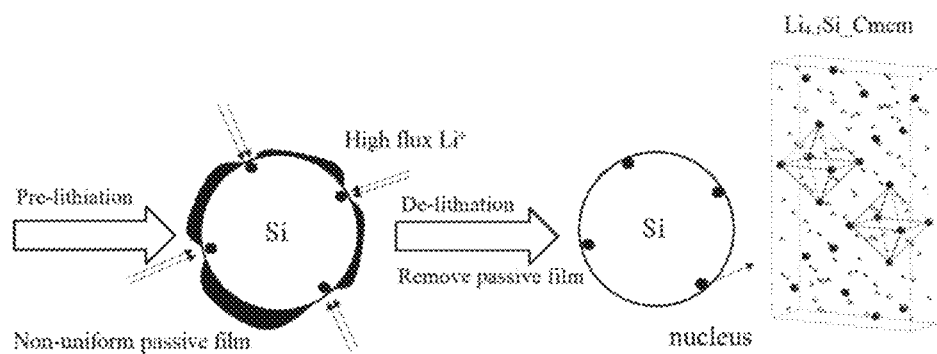
FIG. 1A illustrates a schematic diagram of a manufacturing method for implanting the nucleus of one or more of $Li_{4.1}Si\_Cmcm$, $Li_{13}Si_4\_Pbam$, $Li_2Si\_C12m1$, and $LiSi\_I41/AZ$ into the pure silicon anode, according to an embodiment of the present disclosure.
Figure 1B:
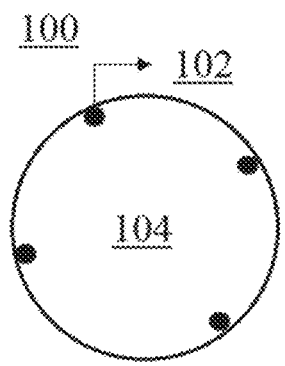
FIG. 1B illustrates a schematic diagram of the pure silicon anode powder containing the nucleus, according to an embodiment of the present disclosure.
Figure 2:
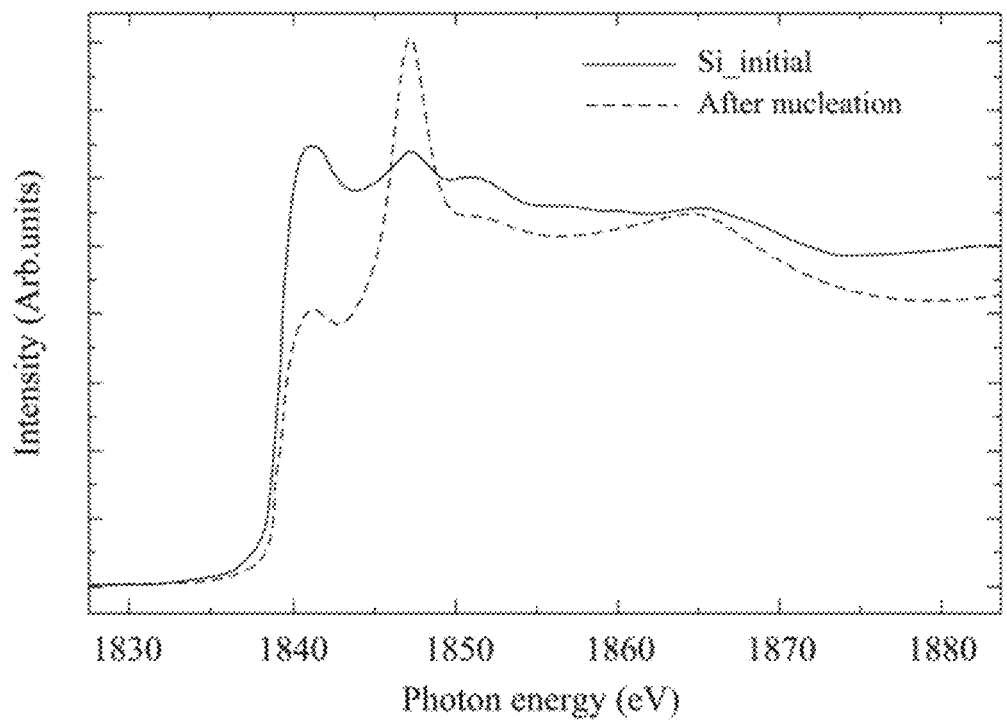
FIG. 2 illustrates an X-ray absorption spectrum of the silicon-based powder after the nucleus is implanted, according to an embodiment of the present disclosure.

Please refer to FIGS. 1A and 1B. In the present invention, a protective layer is disposed on the surface of the (silicon) powder and tiny sites are left uncovered to expose the surface of the powder. Next, the powders are compacted and placed in a groove of a copper substrate, which is then covered by a screen to prevent the powder from shedding. Next, an electrochemical method is used to carry out lithiation and delithiation reactions, in which the electrolyte is EC/DEC+FEC including $LiPF_6$. Because the lithiation reaction will only occur at the sites that are not covered by the protective layer, a relatively high lithium flux (having a lithium ion concentration of greater than 4 atomic percent per unit area) may be generated at these sites by properly controlling the voltage and lithiation rate (between 0.5 C and 30 C). The period of lithiation reaction under high lithium flux is controlled so that the lithiation reaction occurs only on the surface without diffusion into the powder. Therefore, the lithiation is controlled by the surface reaction instead of the diffusion reaction. After the lithiation reaction, a reverse bias is applied to carry out the delithiation reaction. Consequently, powders containing the special nucleuses can be obtained. FIG. 2 shows X-ray absorption spectra of silicon that has not undergone the lithiation and delithiation reactions and silicon that has been embedded by the nucleus after the reaction.

Figure 3:
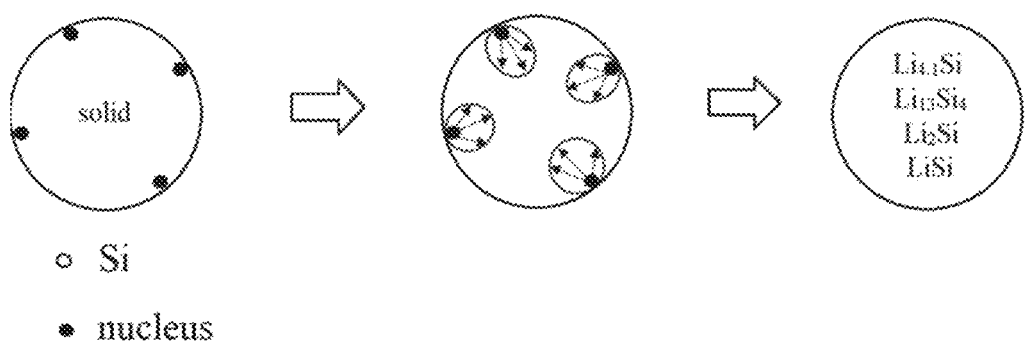
FIG. 3 illustrates a schematic diagram of the structural changes of the pure silicon anode after lithiation, according to an embodiment of the present disclosure.

Please refer to FIG. 3. When the pure silicon anode material powder has the nucleus as described in the present invention, during the lithiation process, the theory of nucleation can be utilized to make the entire powder form one or more structures of $Li_{4.1}Si\_Cmcm$, $Li_{13}Si_4\_Pbam$, $Li_2Si\_C12m1$, and $LiSi\_I41/AZ$.

Figure 4A:
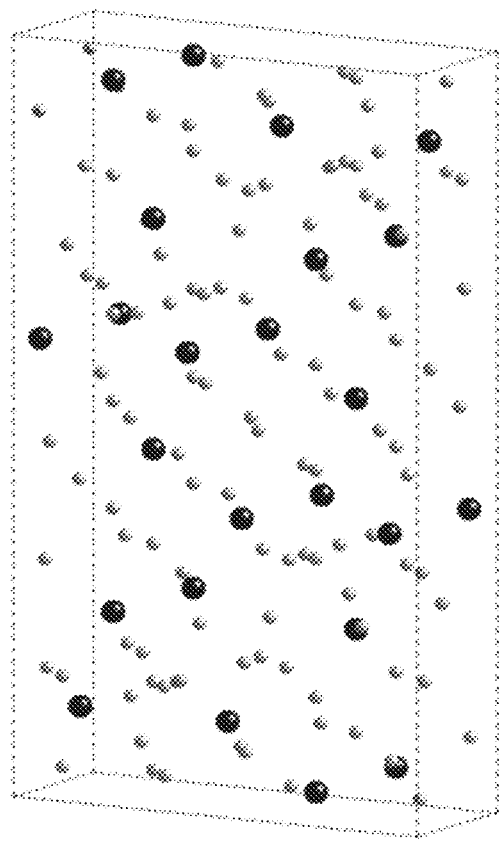
FIG. 4A illustrates structural diagrams of $Li_{4.1}Si\_Cmcm$, according to an embodiment of the present disclosure.
Figure 4A:
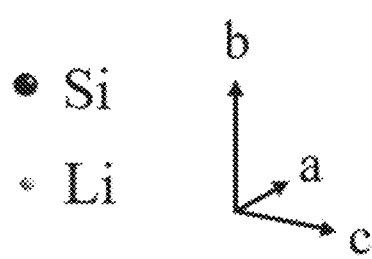
Figure 4B:
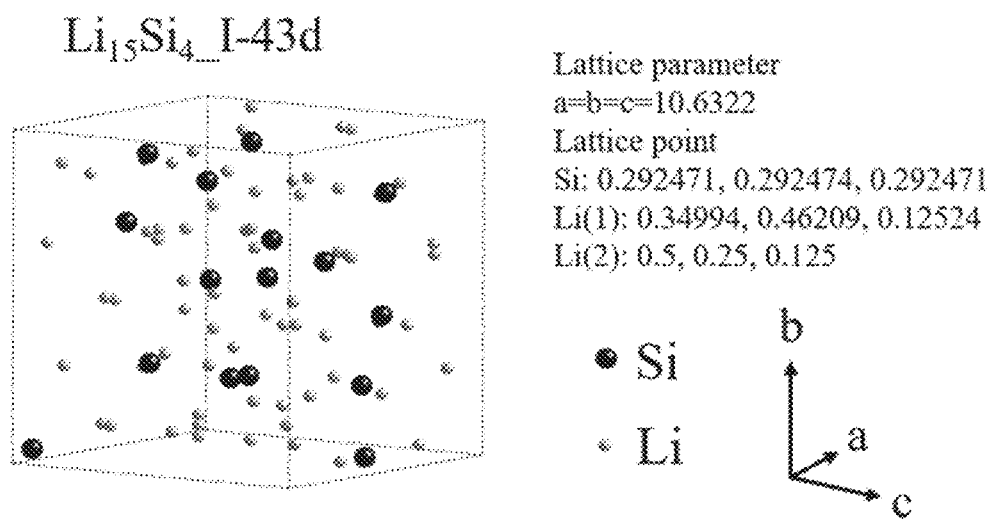
FIG. 4B illustrates structural diagrams of a commonly formed lithium-silicon compound $Li_{15}Si_4\_I$-43d, according to a comparative embodiment of the present disclosure.

The present invention uses X-ray diffraction spectroscopy and X-ray absorption spectroscopy to identify the specially designed pure silicon anodes of the present invention. After the lithiation reaction, one or more lithium-silicon compounds of $Li_{4.1}Si\_Cmcm$, $Li_{13}Si_4\_Pbam$, $Li_2Si\_C12m1$, and $LiSi\_I41/AZ$ are formed. FIGS. 4A and 4B show differences between the final phase $Li_{4.1}Si\_Cmcm$ and the commonly formed phase $Li_{15}Si_4\_I$-43d.

Figure 5:
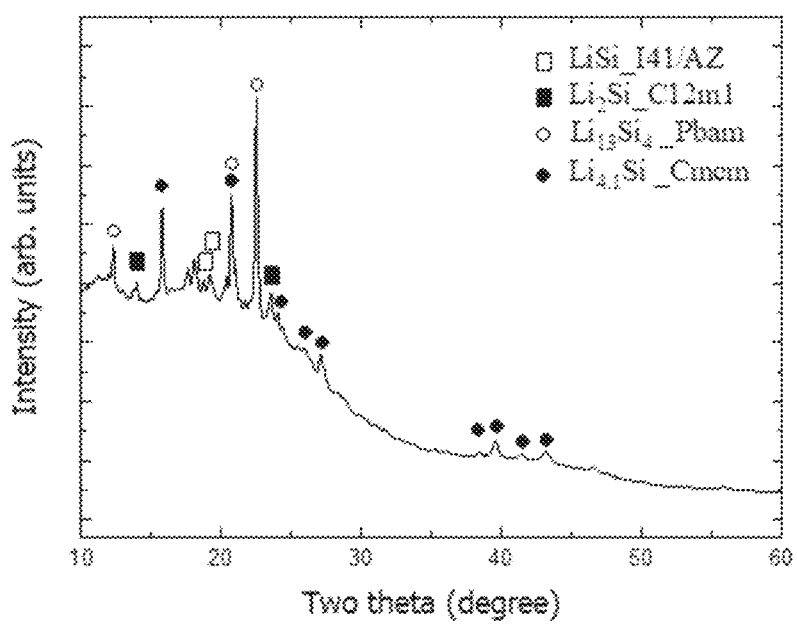
FIG. 5 illustrates X-ray diffraction patterns of $Li_{4.1}Si\_Cmcm$, $Li_{13}Si_4\_Pbam$, $Li_2Si\_C12m1$, and $LiSi\_I41/AZ$, according to an embodiment of the present disclosure.

FIG. 5 shows an X-ray diffraction spectrum that was obtained by synchrotron radiation X-ray with a wavelength of 0.6888 angstrom and energy resolution of $10^{-4}$ ($\Delta E/E$, where E is the X-ray energy), wherein a two-dimensional detector was used to collect diffraction signals. For facilitating comparison, diffraction patterns with the X-ray wavelength of 0.6888 angstrom were converted into patterns with a wavelength of 1.5406 angstrom (a wavelength of X-ray emitted from a Cu target). Peaks in FIG. 5 indicate the existence of compounds $Li_{4.1}$ $Si\_Cmcm$, $Li_{13}Si_4\_Pbam$, $Li_2Si\_C12m1$, and $LiSi\_I41/AZ$ in the specially designed silicon anode of the present invention.

X-ray absorption spectroscopy was performed using synchrotron radiation X-rays. When the X-ray energy was scanned from 1770 eV to 2130 eV, the Lytel detector was used to collect fluorescent signals that emitted from the sample. The incident X-ray energy and the fluorescent intensity were recorded to obtain the X-ray absorption spectrum of the Si K-edge. Please refer to FIGS. 6A and 6B. Because the X-ray absorption spectrum was composed of charge transfer between electronic states and multiple scattering between incident x-ray and scattering x-ray by atoms, such spectrum may reflect valence of the atoms, surrounding environment of the atoms and symmetry of atomic structure. To further identify X-ray absorption spectra, FDMNES was also used to simulate X-ray absorption spectra based on the theory of X-ray absorption and X-ray multiple scattering. The simulated X-ray absorption spectrum of silicon identical to the experimental one can ensure the reliability of simulations.

Figure 6A:
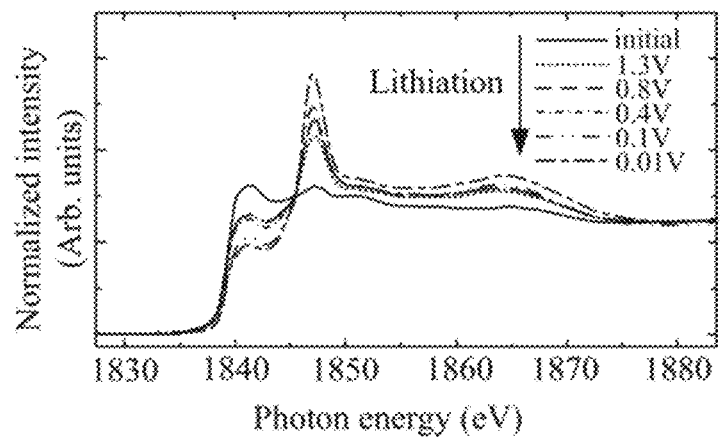
FIGS. 6A and 6B illustrate X-ray absorption spectra of the specifically designed silicon anode as well as the simulated X-ray absorption spectra from theoretical calculations of $Li_{4.1}Si\_Cmcm$, $Li_{13}Si_4\_Pbam$, $Li_2Si\_C12m1$, and $LiSi\_I41/AZ$, according to an embodiment of the present disclosure.
Figure 6B:
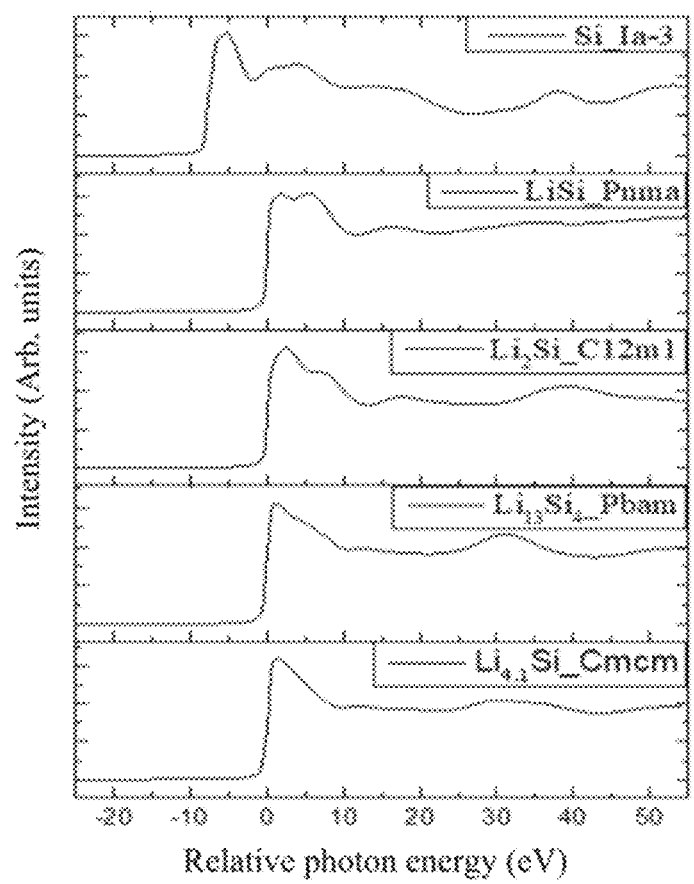

Referring to FIGS. 6A and 6B, the absorption spectrum obtained in the experiment has a clear absorption peak at 1847 eV. Compared to simulated spectra, it is found that the position of the absorption peak of 1847 eV is equivalent to the positions of the absorption peak of the four compounds $Li_{4.1}Si\_Cmcm$, $Li_{13}Si_4\_Pbam$, $Li_2Si\_C12m1$, and $LiSi\_I41/AZ$, indicating existence of one or more of these four compounds, and also indicating that these four compounds have same atomic surroundings, atomic symmetry relationship or electronic structure. By aligning the X-ray absorption spectra with the X-ray diffraction pattern, it is confirmed that the pure silicon anode of the present invention has one or more compounds among $Li_{4.1}Si\_Cmcm$, $Li_{13}Si_4\_Pbam$, $Li_2Si\_C12m1$, and $LiSi\_I41/AZ$.

Figure 7A:
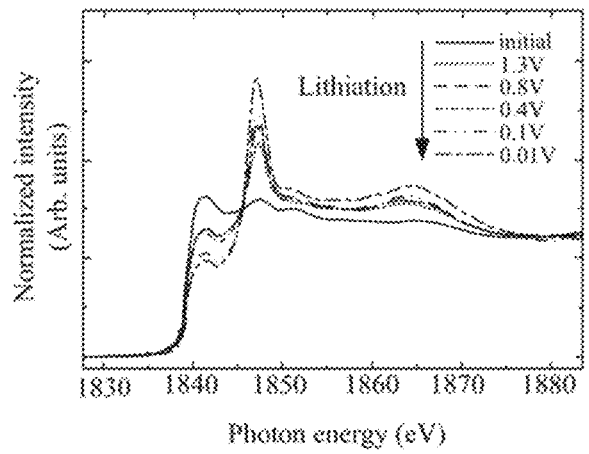
FIGS. 7A and 7B illustrate X-ray absorption spectra of $Li_{4.1}Si\_Cmcm$, $Li_{13}Si_4\_Pbam$, $Li_2Si\_C12m1$, and $LiSi\_I41/AZ$ as well as the simulated X-ray absorption spectra from theoretical calculations of $Li_{17}Si_4\_F$-43m, $Li_{15}Si_4\_I$-43d, $Li_{12}Si_7\_Pnma$, and $Li_5Si_2\_R$-3m, according to an embodiment of the present disclosure.
Figure 7B:
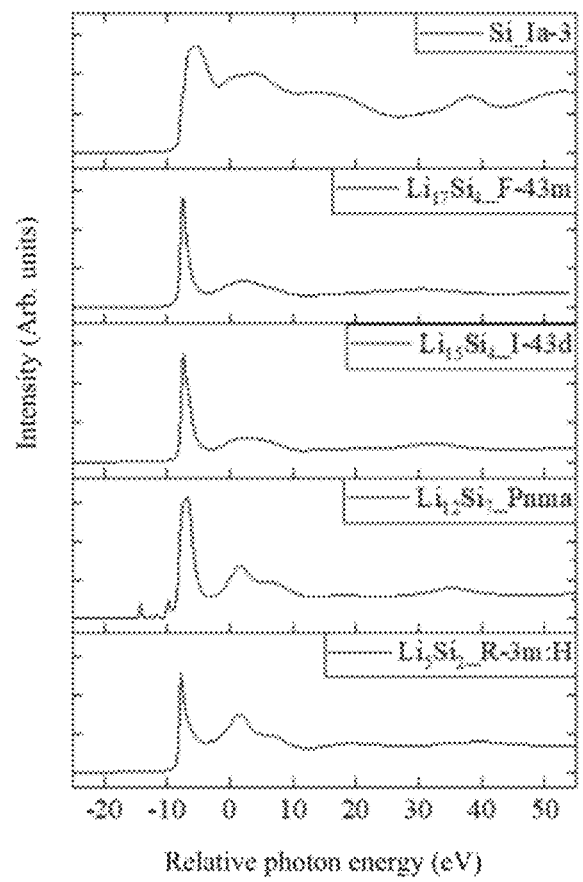

In contrast, the simulation spectra of the four compounds $Li_{17}Si_4\_F$-43m, $Li_{15}Si_4\_I$-43d, $Li_{12}Si_7\_Pnma$, and $Li_5Si_2\_R$-3m (as shown in FIG. 7B), especially the $Li_{15}Si_4\_I$-43d simulation spectrum formed after the lithiation of the ordinary pure silicon anode, show that the strongest absorption peak of these four compounds locating at about 1838 eV, which is significantly different from the absorption peak of the experimental spectrum. This indicates that the pure silicon anode of the present invention has none of the four compounds of $Li_{17}Si_4\_F$-43m, $Li_{15}Si_4\_I$-43d, $Li_{12}Si_7\_Pnma$, and $Li_5Si_2\_R$-3m. This also shows that the above four compounds have significantly different atomic surrounding environments, atomic symmetry relationships or electronic structures, compared to the four compounds of $Li_{4.1}Si\_Cmcm$, $Li_{13}Si_4\_Pbam$, $Li_2Si\_C12m1$, and $LiSi\_I41/AZ$ formed after lithiation of the pure silicon anode of the present invention.

Please refer to FIG. 2. Using X-ray absorption spectroscopy for identification, an existence of a nucleus can be clearly found. A structure of the nucleus is one or more of $Li_{4.1}Si\_Cmcm$, $Li_{13}Si_4\_Pbam$, $Li_2Si\_C12m1$, and $LiSi\_I41/AZ$. The nucleus has the same atomically surrounding environment, atomic structure symmetry or electronic structure as the above four compounds.

Please refer to FIGS. 2 and 3. When the powder of pure silicon anode has the nucleus described in the present invention, the nucleation theory can be utilized to cause the entire powder to form one or more compounds of $Li_{4.1}Si\_Cmcm$, $Li_{13}Si_4\_Pbam$, $Li_2\_Si\_C12m1$, and $LiSi\_I41/AZ$ during the lithiation process. The nucleus has the same atomically surrounding environment, atomic structure symmetry, or electronic structure as the above four structures.

Figure 8:
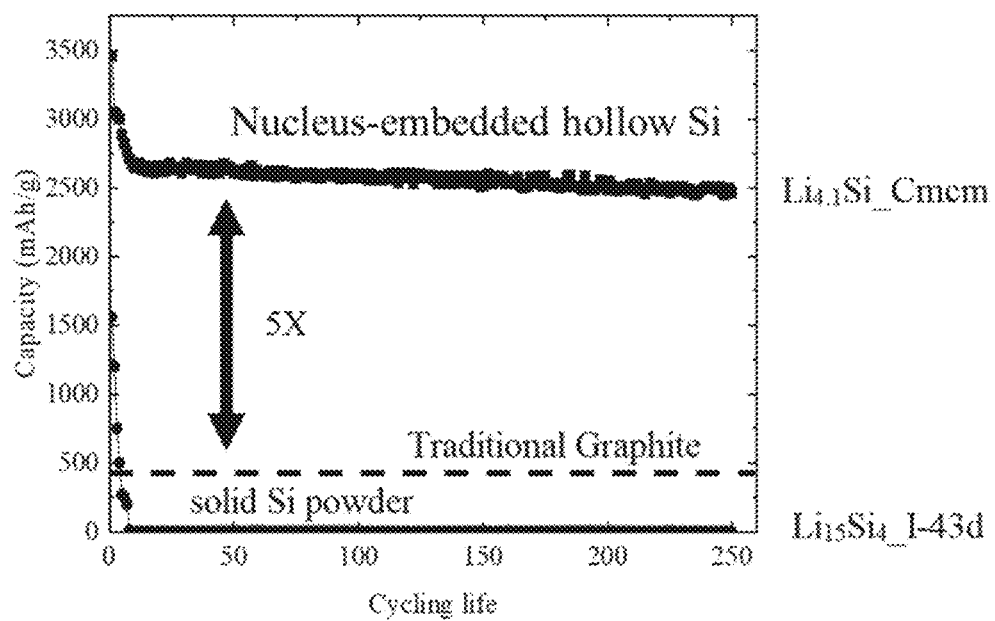
FIG. 8 illustrates a diagram of an electrical capacity test of the pure silicon anode for lithium-ion batteries made by the crystal of the present invention, according to an embodiment of the present disclosure.

With reference to FIG. 8, when the pure silicon anode forms one or more compounds of $Li_{4.1}Si\_Cmcm$, $Li_{13}Si_4\_Pbam$, $Li_2Si\_C12m1$, and $LiSi\_I41/AZ$, because of the final phase of $Li_{4.1}Si\_Cmcm$, the capacity of pure silicon anodes can be greatly increased. When the special pure silicon anode of the present invention is used to assemble the pole pieces and form a half-cell (the electrolyte being EC+DEC+10% FEC) and a lithiation and delithiation test (lithiation/delithiation rate of 0.1 C) is performed, it is found that after 250 cycles of lithiation and delithiation, the pure silicon anode of the present invention can still maintain a capacity of about 2,500 mAh/g. Compared with the traditional graphite electrode, the electrical capacity of the pure silicon anode of the present invention is increased by more than 6 times. Compared with the ordinary pure silicon anode with lithium-silicon compound $Li_{15}Si_4\_I$-43d after lithiation, the capacity is significantly improved.

Figure 9:
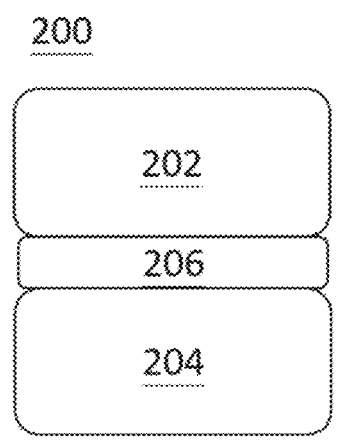
FIG. 9 illustrates a schematic diagram of a lithium-ion battery having the anode of the present invention, according to an embodiment of the present disclosure.

Please refer to FIG. 9, which is a schematic diagram showing the lithium-ion battery prepared in accordance with the present invention. The lithium-ion battery 200 includes an anode 202, a cathode 204, and an isolation film 206 between the anode 202 and the cathode 204.

Figure 10A:
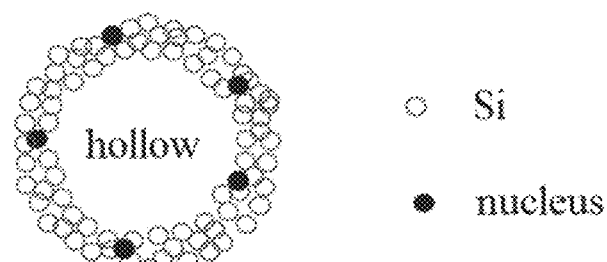
FIG. 10A illustrates a schematic diagram of a nucleus used in the pure silicon anode with a hollow structure, according to an embodiment of the present disclosure.
Figure 10B:
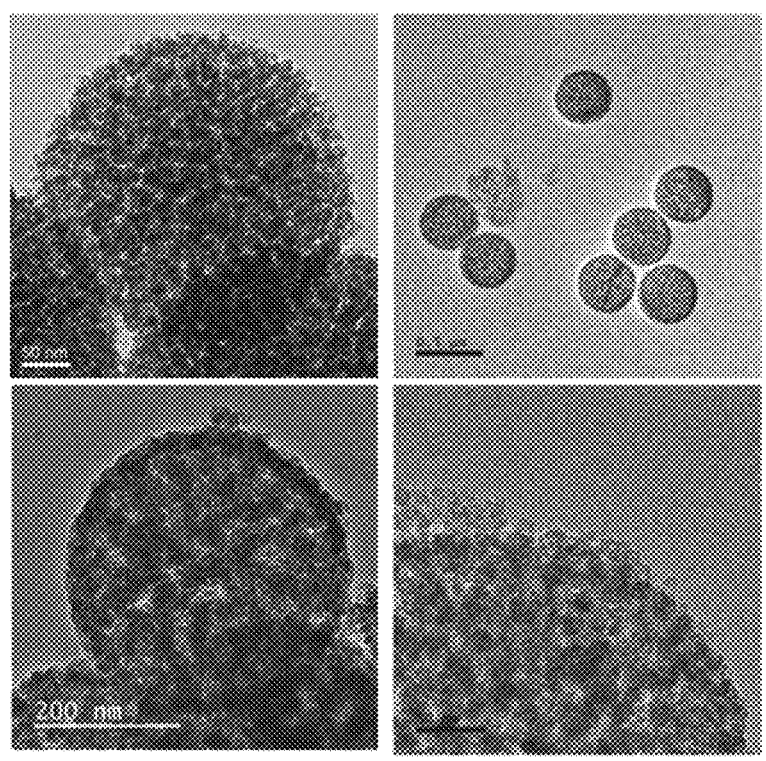
FIG. 10B illustrates a result of observing the pure silicon anode powder with a hollow structure using a transmission electron microscope, according to an embodiment of the present disclosure.

Please refer to FIGS. 10A and 10B. According to the present invention, the method for producing a special nucleus can also be used on silicon anodes with various appearances (such as hollow powder).

The above are only the preferred embodiments of the present invention and are not used to limit the scope of implementation of the present invention, which means that all simple and equivalent changes and modifications made in accordance with the content of the claimed scope and the detailed description of the patent application of the present invention fall within the scope of the invention patent.

What is claimed is:

1. A pure silicon anode of a lithium-ion battery, comprising a first polymorphic lithium-silicon compound and at least a second polymorphic lithium-silicon compound, wherein the first polymorphic lithium-silicon compound comprises a $Li_{4.1}Si\_Cmcm$ having X-ray diffraction peaks at $2\theta$ positions of 15.75±0.1 degree, 20.72±0.1 degree, 24.11±0.1 degree, 26.05±0.1 degree, 27.15±0.1 degree, 39.52±0.1 degree, 41.36±0.1 degree and 43.16±0.1 degree under a Cu target $K\alpha$ X-ray radiation; and the second polymorphic lithium-silicon compound is selected from one or more groups consisting of a $Li_{13}Si_4$_Pbam, a $Li_2Si$_C12/m1, and a LiSi_I41AZ, wherein:

the $Li_{13}Si_4$_Pbam having X-ray diffraction peaks at 2θ positions of 12.33±0.1 degree, 20.72±0.1 degree, and 22.6±0.1 degree under the Cu target Kα X-ray radiation;

the $Li_2Si$_C12/m1 having X-ray diffraction peaks at 2θ positions of 14.05±0.1 degree and 23.61±0.1 degree under the Cu target Kα X-ray radiation; and the LiSi_I41AZ having X-ray diffraction peaks 2θ positions of 18.77±0.1 degree and 19.28±0.1 degree under the Cu target Kα X-ray radiation.

2. The pure silicon anode of claim 1, wherein an X-ray absorption peak appears at 1847±2 eV in the X-ray absorption spectrum.

3. A pure silicon anode for lithium-ion batteries, comprising a plurality of nuclei, wherein each of the nuclei comprises the first polymorphic lithium-silicon compound or the second polymorphic lithium-silicon compound of claim 2.

4. The pure silicon anode for lithium-ion batteries of claim 3, wherein each of the nuclei has a size between 1 nm and 5,000,000 nm.

5. A method to prepare the pure silicon anode of the lithium-ion battery of claim 1, the method comprising:

plating a protective layer on the surface of a pure silicon powder except tiny sites to produce one or more exposed surface; and performing a lithiation reaction to induce a flux of lithium ions having a lithium ion concentration higher than 4 atomic percent per unit area in contact with the exposed surface;

wherein a lithiation rate of the lithiation reaction or a delithiation rate of the delithiation reaction is controlled between 0.5 C and 30 C.

6. The pure silicon anode for lithium-ion batteries of claim 3, wherein the pure silicon anode for lithium-ion batteries is composed of hollow, multilayer, porous, nanowire, nanopillar or nanoparticle morphology, which has a shell thickness, a film thickness, a mold wall thickness and a line width between 1 nm and 100 nm.

7. The method of claim 5, further comprising placing and compacting the pure silicon powder in a groove of a substrate prior to performing the lithiation reaction.

8. The method of claim 7, wherein the substrate comprises copper.

9. The method of claim 7, wherein the substrate and the pure silicon powder are covered by a screen.

10. The method of claim 5, further comprising performing the delithiation reaction after performing the lithiation reaction, wherein an electrolyte of EC/DEC+FEC is used in performing the lithiation reaction and the delithiation reaction.

11. A method for preparing the pure silicon anode of the lithium-ion battery of claim 1, the method comprising:

forming a protective layer on a surface of a pure silicon powder and allowing one or more sites on the surface to have the protective layer with uneven thickness; and performing a pre-lithiation reaction that induces a flux of lithium ions having a lithium ion concentration higher than 4 atomic percent per unit area at the one or more sites.

12. The method of claim 11, wherein forming the protective layer comprises allowing the one or more sites on the surface to be exposed from the protective layer.

13. The method of claim 11, wherein after performing the pre-lithiation reaction, the pure silicon anode being transformed to an amorphous structure comprising one or more short-range-ordering structures.

14. The method of claim 13, wherein performing the pre-lithiation reaction comprises controlling a first voltage and a lithiation rate of a lithiation reaction to be in a range of from about 0.5 C to about 30 C.

15. The method of claim 14, wherein a duration of the lithiation reaction is controlled to limit the lithiation reaction at the surface of the pure silicon powder.

16. The method of claim 14, wherein the pre-lithiation reaction further comprises performing a delithiation reaction with a second voltage having an opposite polarity to the first voltage.

17. The method of claim 14, further comprising performing a nucleation process that expands the short-range-ordering structures in the pure silicon powder.

18. The pure silicon anode of claim 1, wherein the first polymorphic lithium-silicon compound is obtained and exists in the pure silicon anode at room temperature.

* * * * *